Nov. 15, 1960  E. H. HERZOG  2,960,364
CONVEYOR DEVICE
Filed Nov. 12, 1957

INVENTOR.
ERSTON H. HERZOG
BY
Brumbaugh, Free, Graves & Donohue
ATTORNEYS.

United States Patent Office 2,960,364
Patented Nov. 15, 1960

2,960,364
CONVEYOR DEVICE

Erston H. Herzog, Riverdale, N.Y., assignor to Lever Brothers Company, New York, N.Y., a corporation of Maine Filed Nov. 12, 1957, Ser. No. 695,908

10 Claims. (Cl. 294—65)

This invention relates to improvements in conveying devices and has particular reference to vacuum lifting heads for engaging and lifting one or more objects, such as boxes or cartons, and transporting them from one station to another, for example, for stacking or palletizing operations.

Lifting heads are already known which utilize a vacuum for supporting an object or objects on the lifting head. While most of the prior vacuum lifting heads are operative when all of the openings or ports through which suction is exerted are in engagement with the object or objects to be lifted, they are not effective if one or more of these openings or ports is left uncovered due to the absence of an object at the locale of the opening or failure of the object to close the opening. The uncovered opening permits air to enter the lifting head thereby preventing a substantially reduced pressure from being developed in the lifting head or preventing the pressure from being reduced sufficiently to safely lift the object or objects. Attempts to overcome this defect of the prior lifting heads have not been very satisfactory for the reason that the overall supporting action of the head was seriously reduced or the operation of securing the objects to the lifting head required such greatly increased time as to render the use of vacuum lifting heads impractical for high speed conveying operations.

Accordingly, it is an object of this invention to provide a vacuum lifting head having a construction such as to permit the maintenance of a powerful holding vacuum even when one or more of the suction ports or openings therein are left uncovered due to the absence of an object opposing the port or opening.

Another object of the invention is to provide a device for automatically preventing loss of the holding vacuum where one or more of the suction ports or openings in the lifting head is uncovered.

It is also an object of the invention to provide an improved vacuum lifting head in which a suction port or opening not substantially covered by an object to be transported is closed automatically.

Generally, the invention provides a lifting head having a plurality of suction ports or openings through which reduced pressure in the lifting head can act to secure an object or a plurality of objects to the lifting head, each of the ports or openings in the head containing a valve which closes or substantially closes the port or opening whenever it is not closed or covered by an object to provide the desired holding force. The valves thereby assure the maintenance of a reduced pressure in the lifting head sufficient to support other objects which overlie and close the other ports or openings in the lifting head.

Other objects and advantages will become apparent to one skilled in the art to which the invention pertains, from the following detailed description of the present preferred embodiment thereof described with respect to the accompanying drawing in which.

Figure 1:
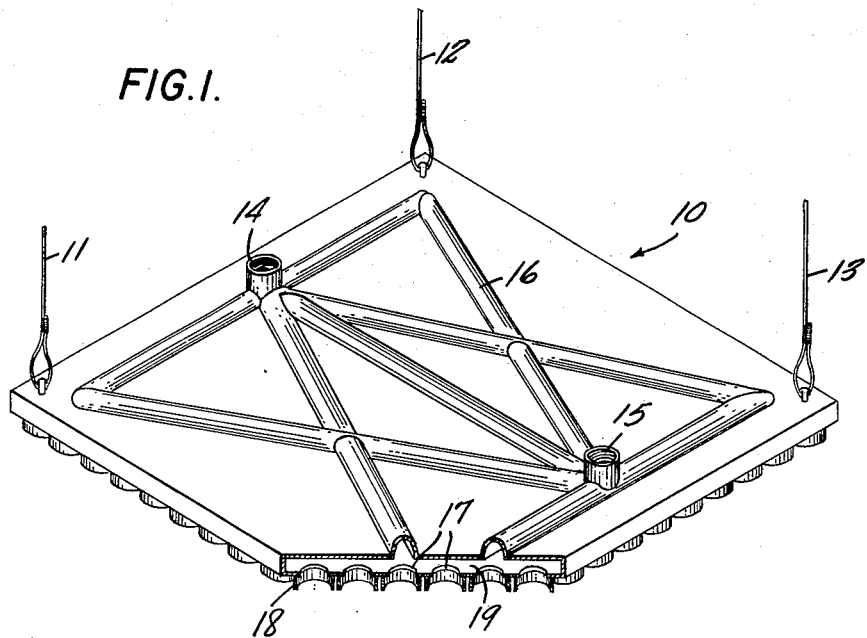
Fig. 1 is a perspective view partly in section of a vacuum manifold body member for utilizing a single vacuum system.

Referring now to Fig. 1 of the drawing, the numeral 10 indicates generally the lifting head or manifold which may consist of a hollow metal body of any convenient shape or configuration, such as substantially square or rectangular as illustrated. Any suitable means such as arms or levers or, as shown in Fig. 1, cables 11, 12 and 13 (the fourth cable being omitted to present a sectional view), may be used to suspend the lifting head from a suitable overhead carriage to enable it to be moved up and down and from one place to another.

The upper surface of the head or manifold 10 is provided with connections 14 and 15 for attaching it to a vacuum pump or a reduced pressure system (not shown). A plurality of corrugations, one of which is indicated by the numeral 16, on the upper surface of the head 10 enables air to be withdrawn from all parts of the interior of the head thereby to maintain a uniform pressure in all parts of the head. The corrugations also make the lifting head more rigid.

A plurality of spaced apart suction ports or openings 17 are formed in the lower surface of the lifting head 10 through which the reduced pressure acts in conjunction with atmospheric pressure on the objects to hold them in engagement with the lifting head. The numbers and arrangement of the ports 17, of course, may be varied considerably, and usually one or more ports is provided at appropriate locations for each object to be lifted. Also, it is understood that the shape of each vacuum holding opening 17 is not limited to the circular form shown in the drawing.

From the construction shown in Fig. 1, it will be seen that when a single object such as a carton, a sheet of material or the like or a plurality of such objects do not cover all or portions of the ports, the pressure in the lifting head cannot be reduced sufficiently to enable the lifting head to lift the object or objects. Therefore, the openings 17 which are uncovered must be closed in order to render the lifting head operative.

Figure 2:
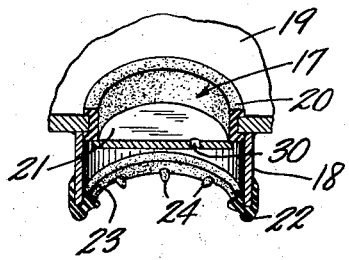
Fig. 2 is a perspective view in cross-section of one construction for the unique valve arrangement according to the invention.

One embodiment of a valve structure for closing the uncovered ports is shown in Fig. 2 of the drawing. While only one such valve will be described, it will be understood that the other suction ports 17 are provided with similar check valves.

Referring now more particularly to Fig. 2 of the drawing, the aperture 17 is shown in the bottom 19 of the lifting head 10. Positioned symmetrically with the opening 17 and depending therefrom is a tubular sleeve 18 which is welded or otherwise attached to the surface 19 to form a substantially air-tight seal. Positioned in the opening 17 is a resilient grommet 20 of rubber, plastic or other suitable material to provide a seat for a disk-like valve member 21 of smaller diameter than the internal diameter of the sleeve 18. A retaining or stop member 22 is secured adjacent the lower end of the sleeve 18 to provide a rest or stop for the diaphragm 21 when the vacuum in the manifold 10 is broken. With the particular stop member 22 shown, the inner shoulder 23 is not sufficiently large for the diaphragm 21 to rest thereagainst and, accordingly, a plurality of projecting prongs or fingers 24 is provided to support the diaphragm 21 in its lower position and allow air to flow around the valve member when a reduced pressure is created in the lifting head. If desired, a relatively small aperture 30 may be formed in the diaphragm 21 to aid in breaking the vacuum when a tight seal is made by the object being conveyed.

Figure 3:
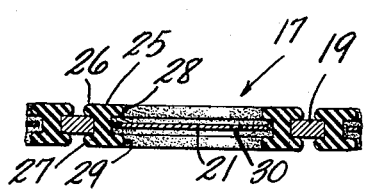
Fig. 3 is a cross-sectional view of another construction for the unique valve arrangement of the invention.

A modification of this valve arrangement is shown in Fig. 3 of the drawing. In this view the aperture 17 is provided with a resilient sleeve or grommet 25 of rubber, plastic, or other suitable material having spaced-apart flanges 26 and 27 for gripping the periphery of the opening 17 and spaced-apart flanges 28 and 29 between which the valve member 21 is movably mounted. In this view, the thickness of the bottom 19 is predetermined to provide the space through which the valve 21 is to move.

A similar valve structure can be provided by mounting sheets of resilient material on the upper and lower surfaces of the bottom 19 of the lifting head and providing smaller openings than the suction ports 17 in the resilient sheets to form spaced-apart flanges above and below the ports 17. A valve member similar to the valve member 21 is mounted between the flanges for movement up and down between them. The valve 21 shown in Fig. 3 and the modification of the valve described above are of smaller diameters than the internal groove in the grommet 25 or the suction opening so that air can flow around the valve member when it is disposed between the flanges.

In operation, the lifting head 10 is positioned over an object to be conveyed. Upon being lowered against the object, a reduced pressure or vacuum is applied to the connections 14 and 15 as, for example, by a suitable vacuum pump (not shown). Air is drawn into the lifting head through the suction ports 17 thereby causing any object closing the lower end of the sleeve 18 to be pushed by atmospheric pressure against the end of the sleeve so that the object is gripped by the lifting head. Small amounts of air entering the lower end of a sleeve 18 can flow through the aperture 30 and around the periphery of the valve member 21. Inasmuch as the air flow through a sleeve 18 is relatively small when the outer end of the sleeve is closed by an object engaging it, the valve member 21 will not be lifted appreciably from the stop ring 24.

On the other hand, air will rush into the openings 17 against which no object is positioned, thereby lifting the valve member 21, which is normally resting against the prongs or fingers 24, against the grommet 20 thereby substantially sealing the opening 17. The other modification of the valve operates similarly and enables a reduced pressure to be maintained in the lifting head for holding the object or objects covering the suctions on the lifting head. The lifting head 10 can then be raised by means of the cables 11, 12 and 13 and moved to another station where the objects are released by breaking the vacuum in the lifting head.

It is to be understood that the above described embodiments are illustrative of the invention. Numerous other arrangements may be devised readily by those skilled in the art, which will embody the principles of the invention and fall within the spirit and scope thereof.

Therefore, it is to be understood that the invention is not limited in its applications to the details of construction and arrangement of parts specifically described or illustrated, and that within the scope of the appended claims it may be practiced otherwise than as specifically described or illustrated.

I claim:

1. A conveyor device including a hollow lifting head having a top and bottom and having at least two openings in its bottom, means for connecting a source of reduced pressure to said lifting head, normally open valve means disposed adjacent each of said openings for sealing its respective opening when the opening is uncovered and when the pressure in said head is reduced, each valve means comprising a valve seat through which air may flow, a stop means on each valve means spaced outwardly from said valve seat adjacent said opening, and a check valve member between said valve seat and said stop means and movable into engagement with said valve seat when said opening is uncovered and the lifting head has a reduced pressure therein.

2. A conveyor device having a movable manifold body member adapted to be connected to a vacuum source, one portion of the body member having a plurality of spaced openings, means to support said movable manifold body member, each of said openings having a normally open valve means comprising a substantially flat, movable diaphragm, resilient flange means formed about the inner circumference of each opening such that said diaphragm forms an effective vacuum seal thereagainst when no object is positioned against said opening, and a stop means spaced from said flange means to retain said diaphragm within said opening when the vacuum is broken.

3. A conveyor device comprising a movable manifold body member adapted to be connected to a vacuum source, one portion of the body member being of a predetermined thickness and having a plurality of spaced openings, a grommet with spaced-apart flanged portions in each of said openings, a substantially flat diaphragm movable within each of said openings between the flanges of each respective grommet, said diaphragm being movable against the flanges of said grommet to seal the respective opening when said vacuum is applied and no object is positioned against the opening, and means to support said movable manifold body member.

4. A conveyor device comprising a movable manifold body member, means on said manifold body member for connecting a vacuum source, one portion of the body member being of a predetermined thickness and having a plurality of spaced openings, a substantially flat diaphragm movable freely within each of said openings, stop means having spaced-apart flanges within each of said openings to limit the movement of the diaphragm, said stop means being formed to provide an effective seal with the diaphragm in one position and to provide a retaining action when the diaphragm is in another position, each diaphragm having a smaller area than the respective opening in which it is movable to enable air to flow around said diaphragm, and means to support said movable manifold body member.

5. A lifting device comprising a hollow lifting head having a wall containing a plurality of openings, means on said head for connecting it to a source of reduced pressure to reduce the pressure in said head, check valve means adjacent to each of said openings, each check valve means comprising a sleeve in axial alignment and communicating with said opening and having inner and outer ends, a valve seat in said sleeve adjacent to its inner end, a valve member in said sleeve freely movable into and out of engagement with said seat, said valve member being of smaller cross-sectional area than said sleeve to enable air to flow around it from said opening into said head, said valve member being movable into engagement with said seat when the pressure in said head is reduced and said opening is uncovered, and said valve member having a small aperture therein.

6. A lifting device comprising a hollow lifting head having a wall containing a plurality of openings, means on said head for connecting it to a source of reduced pressure, check valve means adjacent each of said openings, each check valve means comprising a sleeve of resilient material in axial alignment and communicating with said opening and having inner and outer ends, said inner end of said sleeve being formed to provide a valve seat, and a valve member in said sleeve freely movable into and out of engagement with said seat, said valve member being of smaller cross-sectional area than said sleeve to enable air to flow around it from said opening into said head and said valve member being movable into engagement with said seat when the pressure in said head is reduced and said opening is uncovered.

7. A lifting device comprising a hollow lifting head having a wall containing a plurality of openings, means on said head for connecting it to a source of reduced pressure, check valve means adjacent to each of said openings, each check valve means comprising a sleeve in axial alignment and communicating with said opening and having inner and outer ends, a continuous flange of resilient material within said opening adjacent said inner end to provide a valve seat, means projecting from the outer end of said sleeve to provide a valve member retaining means, and a separate valve member within said sleeve movable into and out of engagement with said seat, said valve member being movable into engagement with said seat when the pressure in said head is reduced and said opening is uncovered.

8. A lifting device as set forth in claim 7 wherein said means projecting from said outer end of said sleeve is in the form of a continuous flange similar to said flange adjacent said inner end.

9. A lifting device as set forth in claim 7 wherein the means projecting from said outer end of said sleeve is in the form of a plurality of knobs spaced at intervals around the circumference of the outer end of said sleeve.

10. A lifting device as set forth in claim 7 wherein the valve member is of suitable dimensions to form a relatively tight fit against the flange extending from said inner end of said sleeve when said opening is uncovered, and said valve member having a relatively small hole therein to permit the reduced pressure within said head to be continuously applied through said opening.

References Cited in the file of this patent

UNITED STATES PATENTS

| | | |
|---|---|---|
| 750,667 | Lewellyn | Jan. 26, 1904 |
| 883,789 | Croy | Apr. 7, 1908 |
| 1,181,271 | Villareal | May 2, 1916 |
| 1,222,535 | Crum | Apr. 10, 1917 |
| 1,421,184 | Dome | June 27, 1922 |
| 1,986,358 | Rasbridge | Jan. 1, 1935 |
| 2,100,550 | Moore | Nov. 30, 1937 |
| 2,253,283 | Minaker | Aug. 19, 1941 |
| 2,308,209 | Schmutzer et al. | Jan. 12, 1943 |
| 2,473,804 | Le Doux | June 21, 1949 |
| 2,715,038 | Billner et al. | Aug. 8, 1955 |
| 2,798,757 | Jackson | July 9, 1957 |
| 2,803,485 | Page et al. | Aug. 20, 1957 |
| 2,815,240 | Lytle | Dec. 3, 1957 |